(12) United States Patent
Yano

(10) Patent No.: US 9,821,609 B2
(45) Date of Patent: Nov. 21, 2017

(54) AIRCRAFT TIRE

(71) Applicant: BRIDGESTONE CORPORATION, Chuo-ku, Tokyo (JP)

(72) Inventor: Takeshi Yano, Tokyo (JP)

(73) Assignee: BRIDGESTONE CORPORATION, Tokyo (JP)

(*) Notice: Subject to any disclaimer, the term of this patent is extended or adjusted under 35 U.S.C. 154(b) by 216 days.

(21) Appl. No.: 14/783,436

(22) PCT Filed: Apr. 2, 2014

(86) PCT No.: PCT/JP2014/059775
§ 371 (c)(1),
(2) Date: Oct. 9, 2015

(87) PCT Pub. No.: WO2014/168062
PCT Pub. Date: Oct. 16, 2014

(65) Prior Publication Data
US 2016/0059639 A1 Mar. 3, 2016

(30) Foreign Application Priority Data

Apr. 12, 2013 (JP) .................. 2013-084210

(51) Int. Cl.
*B60C 11/03* (2006.01)
*B60C 11/13* (2006.01)
*B60C 11/04* (2006.01)
(52) U.S. Cl.
CPC ........ *B60C 11/0327* (2013.01); *B60C 11/042* (2013.01); *B60C 11/1353* (2013.01);
(Continued)

(58) Field of Classification Search
CPC ............ B60C 11/1353; B60C 11/1369; B60C 2011/1361; B60C 2011/0355
(Continued)

(56) References Cited

U.S. PATENT DOCUMENTS 3,773,283 A * 11/1973 Abplanalp .............. B64C 25/40
244/103 S
7,497,240 B2 * 3/2009 Zimmer .................. B60C 11/00
152/209.19
(Continued)

FOREIGN PATENT DOCUMENTS

JP S49-6602 A 1/1974
JP H07-232514 A 9/1995
(Continued)

OTHER PUBLICATIONS

European Search Report dated Feb. 12, 2016, issued in corresponding EP Patent Application.

*Primary Examiner* — Justin Fischer
*Assistant Examiner* — Kendra Ly
(74) *Attorney, Agent, or Firm* — SOLARIS Intellectual Property Group, PLLC

(57) ABSTRACT

An object is to, in an aircraft tire, promote heat dissipation from circumferential direction grooves of a tread and improve durability of the tire. Plural circumferential direction grooves (central side circumferential direction grooves (14), edge portion side circumferential direction grooves (16)) that extend in a tire circumferential direction are formed in a tread (12). In a tire circumferential direction cross-section, a groove bottom (18) of at least one of the circumferential direction grooves has a wave shape having amplitude in a tire radial direction.

5 Claims, 3 Drawing Sheets

(52) U.S. Cl.
CPC ... *B60C 11/1369* (2013.01); *B60C 2011/0341* (2013.01); *B60C 2011/0355* (2013.01); *B60C 2011/1361* (2013.01); *B60C 2200/02* (2013.01)

(58) Field of Classification Search
USPC .................... 244/103 R; 152/209.19, 209.22
See application file for complete search history.

(56) References Cited

U.S. PATENT DOCUMENTS

| | | |
|---|---|---|
| 2007/0137744 A1 | 6/2007 | Ueyoko |
| 2013/0276947 A1 | 10/2013 | Oogane |
| 2013/0276949 A1 | 10/2013 | Yano |

FOREIGN PATENT DOCUMENTS

| | | |
|---|---|---|
| JP | 2007-168784 A | 7/2007 |
| JP | 2012-153310 A | 8/2012 |
| WO | 95/18022 A | 7/1995 |
| WO | 95/18022 A1 | 7/1995 |
| WO | 2012/090917 A1 | 7/2012 |

\* cited by examiner

AIRCRAFT TIRE

TECHNICAL FIELD

The present invention relates to an aircraft tire.

BACKGROUND ART

Japanese Patent Application Laid-Open (JP-A) No. 2012-153310 discloses an aircraft tire in which plural circumferential direction grooves, that extend in the tire circumferential direction, are formed in the tread.

SUMMARY OF INVENTION

Technical Problem

When the aircraft is traveling on land, the aircraft tire rolls on the road surface under a high load that supports the weight of the airframe (the aircraft), and therefore, there is the tendency for the ground-contact pressure of the tread to become somewhat high and the temperature of the tread to increase.

An object of the present invention is to, in an aircraft tire, promote heat dissipation from circumferential direction grooves of the tread, and improve the durability of the tire.

Solution to Problem

An aircraft tire relating to a first aspect of the present invention, includes a plurality of circumferential direction grooves that extend in a tire circumferential direction and that are formed in a tread, wherein, in a tire circumferential direction cross-section, a groove bottom of at least one of the circumferential direction grooves has a wave shape having amplitude in a tire radial direction.

In the above-described aircraft tire, in a tire circumferential direction cross-section, the groove bottom of at least one of the circumferential direction grooves has a wave shape that has amplitude in the tire radial direction. Therefore, as compared with a case in which the groove bottom is flat, the surface area is large, and it is easy for an airflow to be generated within the circumferential direction groove while the tire is rotating. Therefore, heat dissipation from the circumferential direction groove of the tread is promoted, and the durability of the tire can be improved.

In a second aspect of the present invention, in the aircraft tire relating to the first aspect, the wave shape is formed rectilinearly.

In this aircraft tire, because the wave shape of the groove bottom is formed rectilinearly, promotion of turbulent flow within the groove is carried out more effectively.

In a third aspect of the present invention, in the aircraft tire relating to the first aspect or the second aspect, the wave shape is formed as a sawtooth shape at which a long side, which is positioned at one side in the tire circumferential direction, and a short side, which is positioned at another side in the tire circumferential direction and is shorter than the long side, intersect at a tire radial direction outer side.

In this aircraft tire, because the wave shape of the groove bottom is formed as the sawtooth shape, it is easy for the flow of air within the circumferential direction groove while the tire is rotating to become disturbed, and turbulent flow within the groove is promoted, and the heat transference can thereby be improved. Thus, heat dissipation from the circumferential direction groove of the tread can be further promoted.

In a fourth aspect of the present invention, in the aircraft tire relating to the third aspect, a tire radial direction outer side end of the short side is positioned further toward the other side in the tire circumferential direction than a tire radial direction inner side end of the short side.

In this aircraft tire, because the tire radial direction outer side end of the short side is positioned further toward the other side in the tire circumferential direction than the tire radial direction inner side end of the short side, the surface area of the sawtooth-shaped groove bottom becomes even larger. Therefore, heat dissipation from the circumferential direction groove of the tread can be promoted even more. Note that, at an aircraft tire whose rotational direction is not specified, it is desirable that the arrangement of the long sides and the short sides in the tire circumferential direction be opposite at the one side and the other side in the tire transverse direction.

In a fifth aspect of the present invention, in the aircraft tire relating to the first aspect or the second aspect, the wave shape is a triangular wave shape.

In this aircraft tire, because the wave shape is the triangular wave shape, at an aircraft tire whose rotational direction is not specified, the effect of the heat dissipating ability can be improved without being affected by the rotational direction.

In a sixth aspect of the present invention, in the aircraft tire relating to any one of the first aspect through the fifth aspect, the aircraft tire has, as the circumferential direction grooves, a pair of central side circumferential direction grooves that are positioned nearest to a tire transverse direction central side, and edge portion side circumferential direction grooves that are respectively positioned further toward tire transverse direction outer sides than the pair of central side circumferential direction grooves; and the tread has a wide rib that is demarcated by the central side circumferential direction grooves; and narrow ribs that are positioned further toward the tire transverse direction outer sides than the wide rib and are structured to have a narrower width in a tire transverse direction than the wide rib, and that are demarcated by the central side circumferential direction groove and the edge portion side circumferential direction groove that are adjacent to one another in the tire transverse direction, or by the edge portion side circumferential direction grooves that are adjacent to one another in the tire transverse direction; and a tire circumferential direction pitch of the wave shape at the central side circumferential direction grooves is narrower than a tire circumferential direction pitch of the wave shape at the edge portion side circumferential direction grooves.

In this aircraft tire, the surface area of the groove bottom is larger at the central side circumferential direction grooves than at the edge portion side circumferential direction grooves. Accordingly, the heat of the wide rib, at which it is easier for heat to be generated than at the narrow ribs, can be diffused effectively from the central side circumferential direction grooves. Further, due thereto, heat dissipation from the tread can be carried out in a well-balanced manner.

Advantageous Effects of Invention

In accordance with the aircraft tire relating to the present invention, the excellent effect is obtained that heat dissipation from circumferential direction grooves of the tread is promoted, and the durability of the tire can be improved.

DESCRIPTION OF EMBODIMENTS

An embodiment of the present invention are described hereinafter on the basis of the drawings. Arrow C in FIG. 1 indicates the tire circumferential direction, and arrow X indicates the tire axial direction (the tire transverse direction). Further, in FIG. 2 through FIG. 5, arrow R indicates the tire radial direction. In the tire transverse direction, the side that is near to a tire equatorial plane CL is called the "central side", and the sides that are far from the tire equatorial plane CL are called the "edge portion sides".

An internal structure that is similar to that of a conventionally known aircraft tire can be used as the internal structure of an aircraft tire 10. Accordingly, description of the internal structure of the aircraft tire 10 is omitted.

Figure 1:
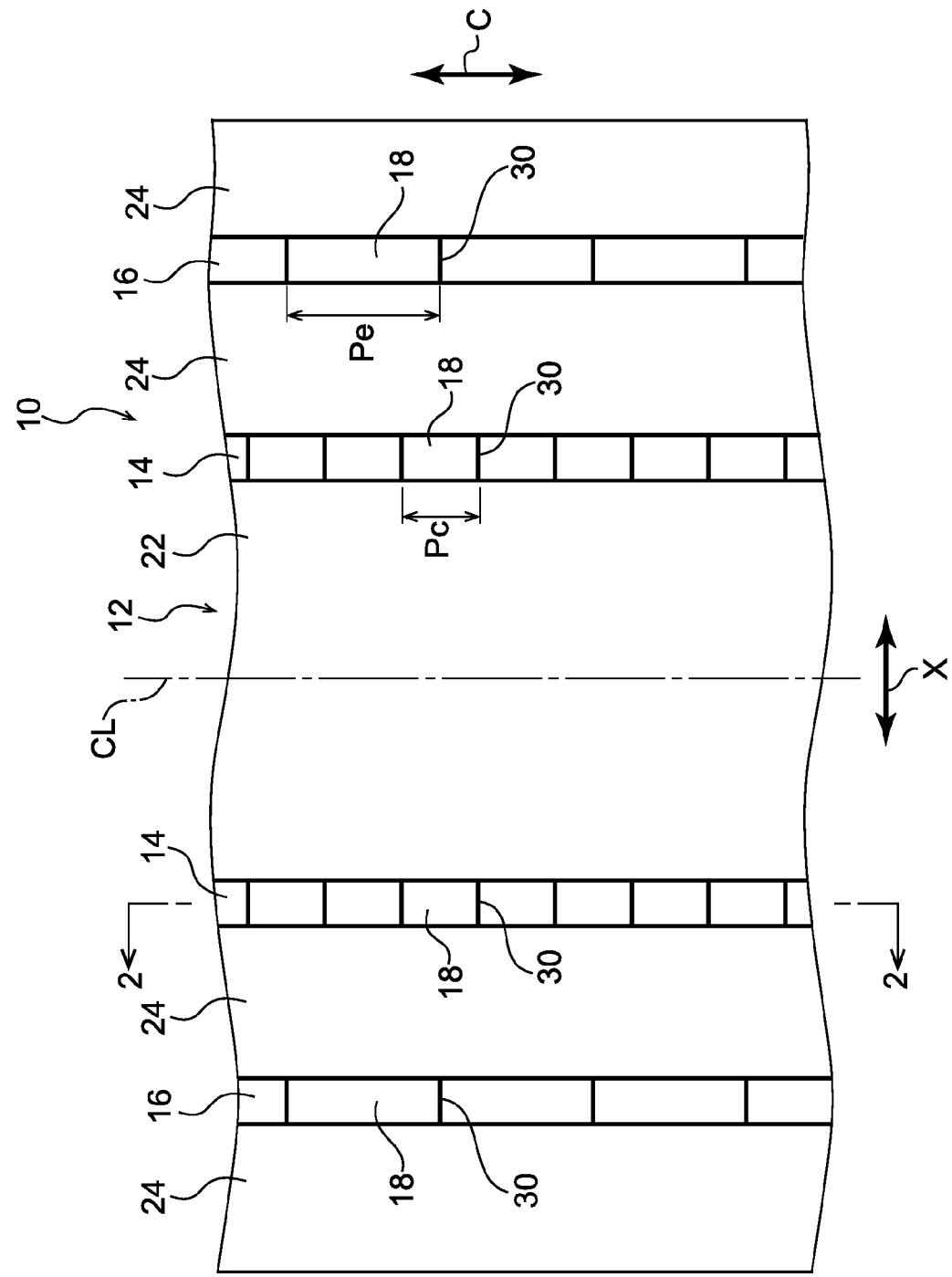
FIG. 1 is a development showing a tread of an aircraft tire seen from a tire radial direction outer side.
Figure 2:
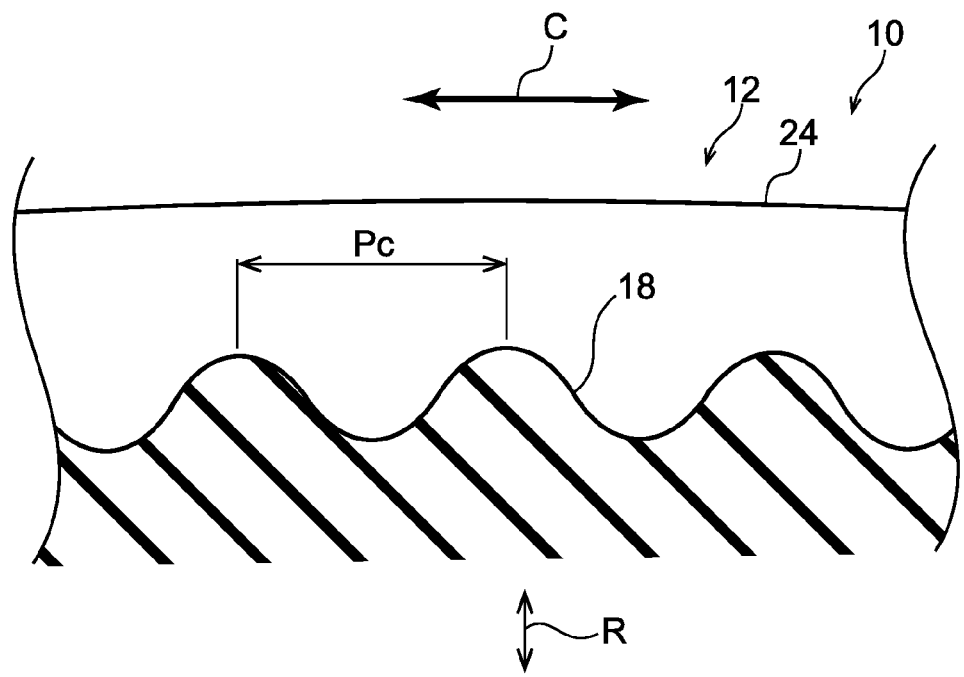
FIG. 2 is a partial, enlarged sectional view seen in the arrow 2-2 direction in FIG. 1, showing an example in which a groove bottom is formed in an arc-shaped wave shape.

In FIG. 1, at the aircraft tire 10 relating to the present embodiment, plural circumferential direction grooves (e.g., central side circumferential direction grooves 14, edge portion side circumferential direction grooves 16) that extend in the tire circumferential direction are formed in a tread 12. As shown in FIG. 2, in a tire circumferential direction cross-section, a groove bottom 18 of at least one of the circumferential direction grooves (e.g., the central side circumferential direction groove 14) has a wave shape that has amplitude in the tire radial direction. In the present embodiment, the wave shapes of the groove bottom 18 are formed at the respective central side circumferential direction grooves 14 and edge portion side circumferential direction grooves 16, i.e., at all of the circumferential direction grooves. The amplitude of the wave shape is constant for example.

For example, a pair of the central side circumferential direction grooves 14, that are positioned nearest to the tire transverse direction central side, and the edge portion side circumferential direction grooves 16, that are positioned respectively at the tire transverse direction outer sides of the pair of central side circumferential direction grooves 14, are formed as the circumferential direction grooves. Two of each of the central side circumferential direction grooves 14 and edge portion side circumferential direction grooves 16 are formed, and a total of four circumferential direction grooves are formed in the tread 12. Note that four of the edge portion side circumferential direction grooves 16 may be formed. Namely, there may be a total of six circumferential direction grooves.

The tread 12 has a wide rib 22 that is demarcated by the central side circumferential direction grooves 14, and narrow ribs 24 that are positioned further toward the tire transverse direction outer sides than the wide rib 22 and are structured to have narrower widths in the tire transverse direction than the wide rib 22, and that are demarcated by the central side circumferential direction grooves 14 and the edge portion side circumferential direction grooves 16 that are adjacent to one another in the tire transverse direction, or by the edge portion side circumferential direction grooves 16 that are adjacent to one another in the tire transverse direction.

In the example shown in FIG. 2, the wave shape of the groove bottom 18 is formed as arc-shaped wave shape such as, for example, a sine wave or the like. The radii of curvature of the mountains and the vicinities of the valleys of the arcs are respectively 5~500 mm for example. Further, in the example shown in FIG. 3, the wave shape of the groove bottoms 18 is formed as a sawtooth shape in which a long side 26, which is positioned at one side in the tire circumferential direction, and a short side 28, which is shorter than the long side 26 and is positioned at the another side in the tire circumferential direction, intersect at, for example, a peak 20 at the tire radial direction outer side. In other words, angle θA, that is formed by tangent line T to the tire circumferential direction and the long side 26, is set to be smaller than angle θB, that is formed by this tangent line T and the short side 28. The wave shape is formed rectilinearly.

Figure 3:
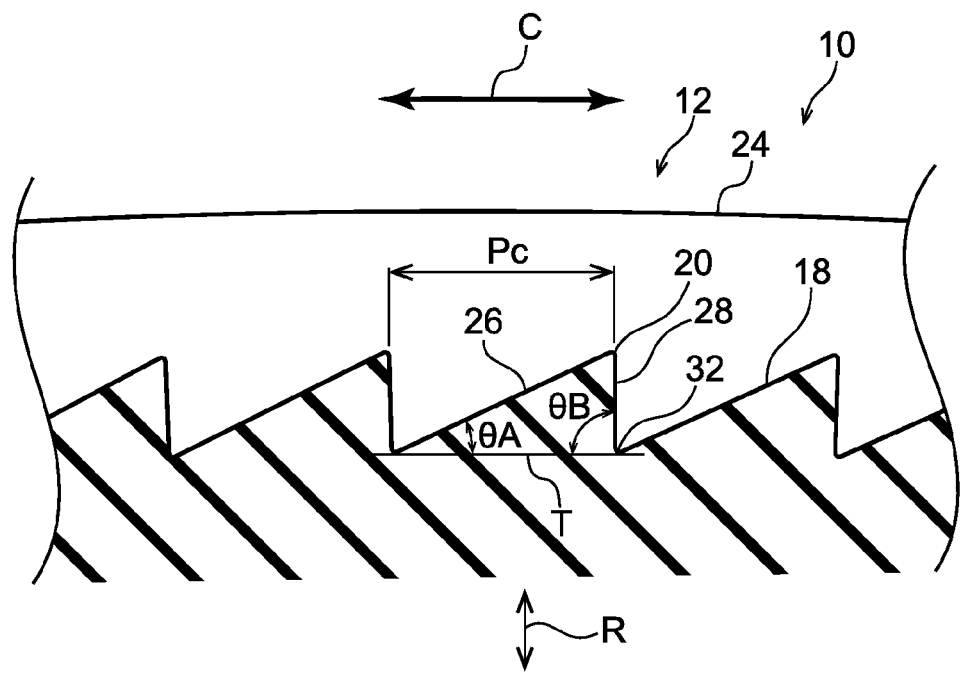
FIG. 3 is a cross-sectional view corresponding to FIG. 2 and showing an example in which the groove bottom is formed in sawtooth shapes.
Figure 4:
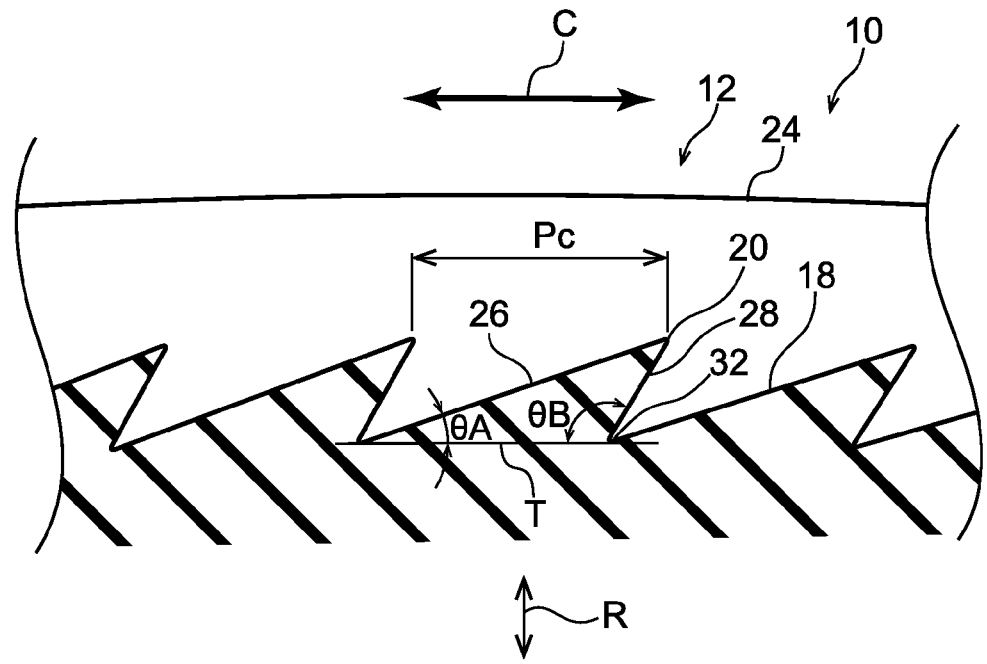
FIG. 4 is a cross-sectional view corresponding to FIG. 2 and showing an example in which the groove bottom is formed in sawtooth shapes that are sharper than in the case of FIG. 3.

In the example shown in FIG. 4, the wave shape of the groove bottom 18 is formed as a sawtooth shape, and the tire radial direction outer side ends (the peaks 20) of the short sides 28 are positioned further toward the other side, in the tire circumferential direction, than tire radial direction inner side ends 32 of the short sides 28. In other words, angle θB is set to be larger than in the case of FIG. 3. Concretely, angle θB in FIG. 3 is substantially a right angle, but angle θB in FIG. 4 is an obtuse angle. At the tire radial direction inner side end 32 of the short side 28, that short side 28 and the long side 26 intersect at an acute angle.

Figure 5:
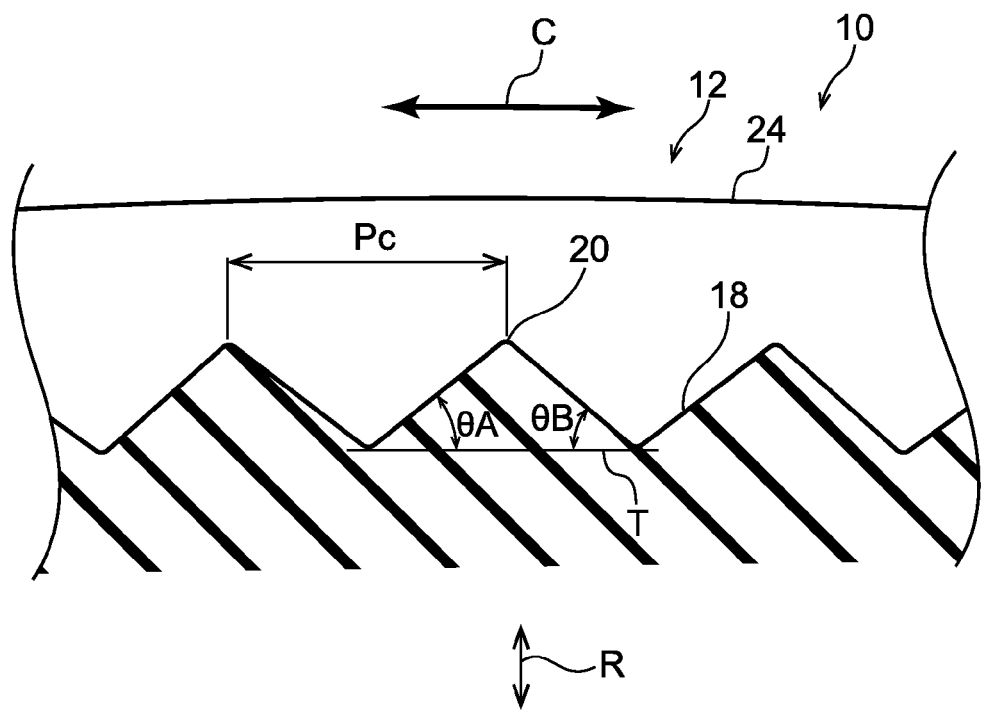
FIG. 5 is a cross-sectional view corresponding to FIG. 2, and showing an example in which the groove bottom is formed in a triangular wave shape.

Further, in the example shown in FIG. 5, the wave shape of the groove bottom 18 is formed as a triangular wave shape. In other words, θA≈θB.

The cases of the groove bottoms 18 shown in FIG. 2 and FIG. 5 (the arc-shaped wave shape and the triangular wave shape) are not affected by the tire rotational direction. In contrast, the cases of the groove bottoms 18 shown in FIG. 3 and FIG. 4 (the sawtooth shape) are affected by the tire rotational direction. Accordingly, at aircraft tires whose rotational direction is not specified, it is desirable that the arrangement of the long sides 26 and the short sides 28 in the tire circumferential direction be opposite at the one side and the other side in the tire transverse direction.

In FIG. 1, for all of the wave shape, tire circumferential direction pitch Pc of the wave shape at the central side circumferential direction grooves 14 is more narrow than tire circumferential direction pitch Pe of the wave shape at the edge portion side circumferential direction grooves 16. In a case in which the respective pitches vary in the tire circumferential direction, the respective averages are computed.

Note that the peaks of the wave shape at the groove bottoms 18 form ridgelines 30 (see FIG. 1) that are continuous in the tire axial direction. It is desirable that, at circumferential direction grooves that are adjacent to one another in the tire transverse direction, e.g., at the central side circumferential direction groove 14 and the edge portion side circumferential direction groove 16 at one side of the tire equatorial plane CL, the tire circumferential direction positions of the ridgelines differ from one another. Note that the ridgelines are not limited to being parallel to the tire axial direction, and may be inclined with respect to the tire axial direction.

(Operation)

The present embodiment is structured as described above, and the operation thereof is described hereinafter. In FIG. 1 and FIG. 2, at the aircraft tire 10 relating to the present embodiment, in a tire circumferential direction cross-section, the groove bottom 18 of at least one of the circumferential direction grooves (e.g., the central side circumferential direction groove 14) has the wave shape that has amplitude in the tire radial direction. Accordingly, as compared with a case in which the groove bottom 18 is flat, the surface area is large, and, further, it is easy for an airflow to be generated within the circumferential direction groove while the tire is rotating. Therefore, heat dissipation from the circumferential direction groove of the tread 12 is promoted, and the durability of the tire can be improved.

In the example shown in FIG. 3, the wave shape of the groove bottom 18 is formed as the sawtooth shape, and therefore, it is easy for the flow of air within the circumferential direction groove (e.g., the central side circumferential direction groove 14) while the tire is rotating to become disturbed, and turbulent flow within the groove is promoted, and the heat transference can thereby be improved. Thus, heat dissipation from the circumferential direction groove of the tread 12 can be further promoted.

In the example shown in FIG. 4, the tire radial direction outer side ends (the peaks 20) of the short sides 28 are positioned further toward the other side in the tire circumferential direction than the tire radial direction inner side ends 32 of the short sides 28. Thus, the surface area of the sawtooth-shaped groove bottom 18 becomes even larger. Therefore, heat dissipation from the circumferential direction groove of the tread 12 can be promoted even more. In the example shown in FIG. 5, because the wave shape is the triangular wave shape, at an aircraft tire those rotational direction is not specified, the effect of the heat dissipating ability can be improved without being affected by the rotational direction.

In FIG. 1, at the aircraft tire 10, the volume of the wide rib 22 is greater than that of the narrow rib 24, and further, the wide rib 22 is positioned at the tire center portion where the ground-contact pressure is high, and thus, it is easier for heat to be generated than at the narrow rib 24. With respect thereto, in the present embodiment, the tire circumferential direction pitch Pc of the wave shape at the central side circumferential direction grooves 14 that demarcate the wide rib 22 is narrower than the tire circumferential direction pitch Pe of the wave shape at the edge portion side circumferential direction grooves 16. Namely, the surface area of the groove bottom 18 is larger at the central side circumferential direction groove 14 than at the edge portion side circumferential direction groove 16. Accordingly, the heat of the wide rib 22 can be diffused efficiently from the central side circumferential direction grooves 14. Further, due thereto, heat dissipation from the tread 12 can be carried out in a well-balanced manner.

[Other Embodiments]

In cases in which the wave shape of the groove bottom 18 is the sawtooth shape as shown in FIG. 3 and FIG. 4, it is desirable that the orientations of the saw teeth be set alternately at half of the plural circumferential direction grooves. This is because, in an aircraft tire whose rotational direction is not specified, by setting the arrangement of the long sides 26 and the short sides 28 to be alternate, the effect of the heat dissipating ability can be improved without being affected by the rotational direction.

The wave shape of the groove bottom 18 is not limited to those illustrated in FIG. 2 through FIG. 5, and may be a rectangular wave shape, a polygonal shape, or the like. Further, various wave shape may be combined appropriately in the tire circumferential direction. The wave shape may be formed intermittently in the tire circumferential direction.

(Experimental Examples)

Tests on wear performance and durability were carried out on tires relating to a Conventional Example and an Example. The tire size is 46x17R20 30PR. The internal structure of the tire is similar to that disclosed in JP-A No. 2012-153310. The groove bottoms of the circumferential direction grooves in the Conventional Example are flat. The groove bottoms of the circumferential direction grooves in the Example are the shape shown in FIG. 2. The test methods respectively are as follows.

[Wear Performance]

At a wear characteristic testing device, the shear stress that is generated in the tire circumferential direction at the contact surface of the tire/road surface, and the relative slip amount of the tire/road surface, were measured. The wear resistance was computed on the basis of a value obtained by integrating, in the tire circumferential direction and at respective regions in the tire transverse direction, the wear workload (=shear force×slip amount). In Table 1, the wear performance is shown with the Conventional Example being an index of 100, and the higher the numerical value, the better the performance.

[Durability]

By a drum testing device, a prescribed takeoff test was carried out repeatedly at a prescribed internal pressure and a prescribed load, and the number of rotations until a tire defect arose was measured. In Table 1, the durability is shown in Table 1 with the Conventional Example being an index of 100, and the higher the numerical value, the better the performance. Note that "prescribed" means the prescriptions that are respectively set by the TRA (Tire & Rim Association).

As shown in Table 1, it can be confirmed that, in accordance with the Example, the durability can be improved by 10% while a wear performance that is equal to that of the Conventional Example is maintained.

TABLE 1

|  | Conventional Example | Example |
| --- | --- | --- |
| wear performance | 100 | 100 |
| durability | 100 | 110 |

The disclosure of Japanese Patent Application No. 2013-84210 filed on Apr. 12, 2013 is, in its entirety, incorporated by reference into the present specification.

All publications, patent applications, and technical standards mentioned in the present specification are incorporated by reference into the present specification to the same extent as if such individual publication, patent application, or technical standard was specifically and individually indicated to be incorporated by reference.

EXPLANATION OF REFERENCE NUMERALS 10 aircraft tire
12 tread
14 central side circumferential direction groove (circumferential direction groove)
16 edge portion side circumferential direction groove (circumferential direction groove)
18 groove bottom 22 wide rib
24 narrow rib
26 long side
28 short side
32 tire radial direction inner side end
Pc tire circumferential direction pitch
Pe tire circumferential direction pitch

The invention claimed is:

1. An aircraft tire, comprising a plurality of circumferential direction grooves that extend in a tire circumferential direction and that are formed in a tread, wherein, in a tire circumferential direction cross-section, a groove bottom of at least one of the circumferential direction grooves has a wave shape having amplitude in a tire radial direction, and wherein the aircraft tire has, as the circumferential direction grooves, a pair of central side circumferential direction grooves that are positioned nearest to a tire transverse direction central side, and edge portion side circumferential direction grooves that are respectively positioned further toward tire transverse direction outer sides than the pair of central side circumferential direction grooves;

the tread has a wide rib that is demarcated by the central side circumferential direction grooves; and narrow ribs that are positioned further toward the tire transverse direction outer sides than the wide rib and are structured to have a narrower width in a tire transverse direction than the wide rib, and that are demarcated by the central side circumferential direction groove and the edge portion side circumferential direction groove that are adjacent to one another in the tire transverse direction, or by the edge portion side circumferential direction grooves that are adjacent to one another in the tire transverse direction; and a tire circumferential direction pitch of the wave shape at the central side circumferential direction grooves is narrower than a tire circumferential direction pitch of the wave shape at the edge portion side circumferential direction grooves.

2. The aircraft tire of claim 1, wherein the wave shape is formed rectilinearly.

3. The aircraft tire of claim 1, wherein the wave shape is formed as a sawtooth shape at which a long side, which is positioned at one side in the tire circumferential direction, and a short side, which is positioned at another side in the tire circumferential direction and is shorter than the long side, intersect at a tire radial direction outer side.

4. The aircraft tire of claim 3, wherein a tire radial direction outer side end of the short side is positioned further toward the other side in the tire circumferential direction than a tire radial direction inner side end of the short side.

5. The aircraft tire of claim 1, wherein the wave shape is a triangular wave shape.

* * * * *